Feb. 15, 1927.
L. S. UPHOFF
1,617,467
RADIO SIGNALING SYSTEM
Filed Dec. 30, 1922
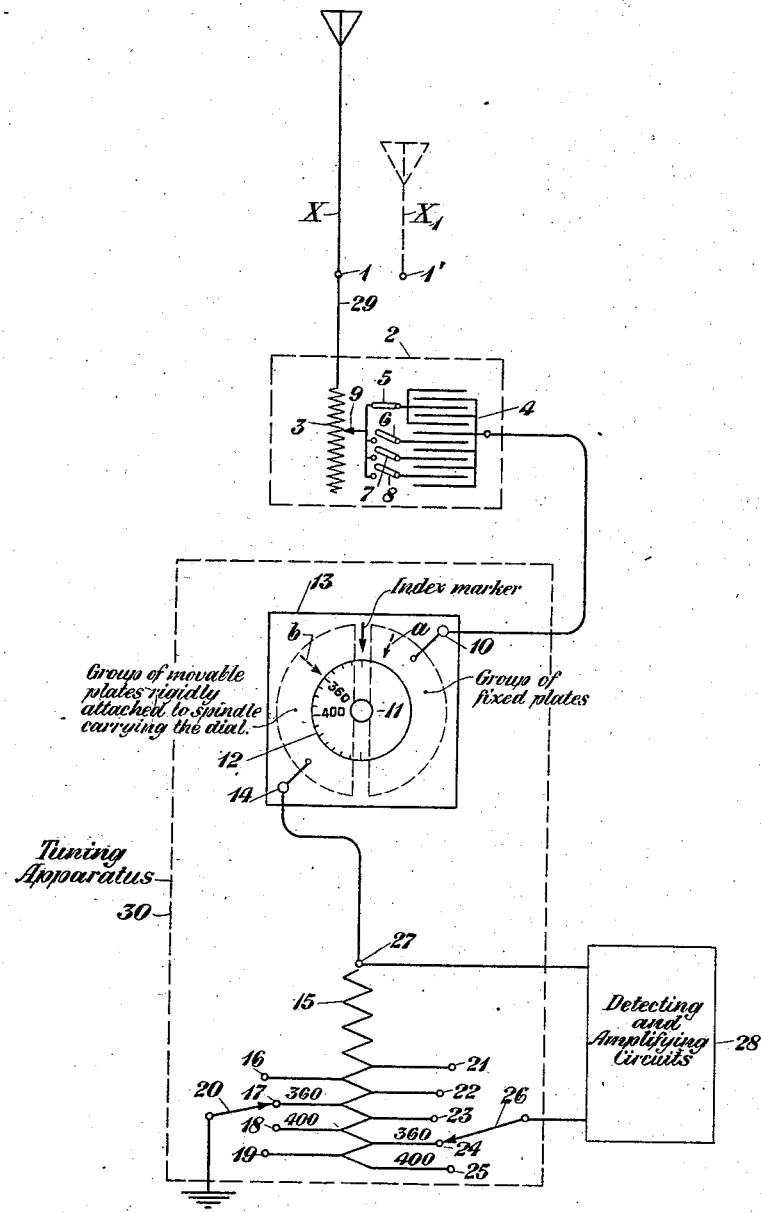
INVENTOR
L. S. Uphoff
BY
John M. Elone
ATTORNEY Patented Feb. 15, 1927.

1,617,467

UNITED STATES PATENT OFFICE.

LESLIE S. UPHOFF, OF BROOKLYN, NEW YORK, ASSIGNOR TO AMERICAN TELEPHONE AND TELEGRAPH COMPANY, A CORPORATION OF NEW YORK.

RADIO SIGNALING SYSTEM.

Application filed December 30, 1922. Serial No. 609,984.

This invention relates to radio signaling systems and particularly to calibrating the tuning apparatus of a radio receiving circuit by placing wave length or other designations at the proper points and providing a method and means for adjusting the calibrated apparatus of a radio receiving circuit so that such calibrated apparatus may be used with any aerial.

In the manufacture of radio receiving sets such as are now sold for use in connection with the broadcasting services now being provided in various parts of the country, no attempt is made to calibrate such sets by placing wave length designations at the proper points. The user must, therefore, operate the controls blindly until signals from a given station are received. It is proposed in this invention to test and calibrate such receiving sets at the factory in connection with what may be termed a standard or average aerial conductor. This calibration consists in marking upon the dials or face plates of the apparatus suitable numerals or other designations to represent the proper relative position of the rotatable member for the proper reception of signals of various transmitting stations or at various wave lengths. Thus, the variable inductance connected in series in the antenna circuit and across which the detecting and amplifying apparatus might be bridged may have a plurality of taps taken therefrom and connected with a plurality of contact points of switches, which contact points could be so marked as to indicate that when the rotatable arms of the switches rested upon particular contact points, the receiving apparatus would be properly adjusted (in so far as the inductance is concerned) for the reception of signals having the wave length indicated by the numeral or other designations associated with the said contact points upon which the arms rested. In somewhat similar manner, the variable air condenser associated with the antenna circuit would be calibrated for the standard aerial. This calibration consists in rotating the group of movable plates until the proper amount of capacity is added to the circuit to make it highly receptive of a particular frequency. The point upon the circular dial attached to the spindle of the movable plates, which at the time of resonance stood opposite the index marker attached to the face plate of the air condenser, would be marked with the numeral indicating the wave length at which the circuit was resonant and, in like manner, the dial would be marked for other wave lengths with which the receiving set is intended to operate.

It will be apparent that these markings, both upon the variable inductance and also upon the variable condenser, depend for their accuracy upon the electrical constants of the aerial with which the receiving set is connected at the time of calibration and testing according to the well known formula $$W = k\sqrt{LC},$$

in which W represents the wave length $k$ a constant, L the inductance and C the electrical capacity of the antenna circuit. If an aerial having different constants is used to complete the antenna circuit of such a set, the wave length markings upon the variable inductance and upon the condenser would not be correct for the latter type of aerial unless the value of L and C in the formula happened to be the same as when the set was calibrated. This would rarely be the case in practice.

It is the object of this invention to provide a method and means for adjusting the antenna circuit of a radio receiving circuit so that the wave length markings or other designations upon the various apparatus will correctly indicate the proper wave length or designation, regardless of the constants of the aerial of the antenna by providing a means of making L and C of the antenna circuit the same as when the set was calibrated.

This invention will be clearly understood from the following description when read in connection with the attached drawing which shows one form of embodiment of the invention.

In the drawing, X represents what may be termed a standard aerial, such as would be used at the factory or shop where radio receiving sets are manufactured, and $X_1$ represents an aerial having different electrical constants such, for example, as would be used by the amateur user of such receiving sets. The aerial X is connected by conductor 29 at the point 1 with an auxiliary inductance-capacity adjustment set 2, the purpose of which will be made clear hereinafter. This adjustment set 2 comprises a variable inductance 3 and a condenser 4, which is variable by fairly large steps. The condenser 4 consists of a number of units of the same or different sizes which are adapted to be effectively connected with the inductance 3 by means of the switches 5, 6, 7 and 8. The connection between the condenser and the inductance may be rendered variable by means of the contact point 9. The condenser 4 is connected with a binding post 10 of the air condenser 13, which post is connected with the group of fixed plates of the said condenser. A group of movable plates is rigidly fastened to a spindle 11, to which is also attached a dial 12. The group of movable plates is connected with the binding post 14, which is connected with a variable inductance 15. This variable inductance, which may be in the nature of an auto-transformer as shown in the drawing or a transformer with separate primary and secondary, has a plurality of taps connected with the contact points 16, 17, 18 and 19, with which the grounded arm 20 is adapted to co-act. The inductance has also another group of taps connected with the contact points 21, 22, 23, 24 and 25, with which the rotatable arm 26 coacts. A detecting and amplifying circuit 28, which may be of any type, are connected across the inductance 15 between the terminal 27 and the rotatable arm 26. The apparatus shown within on the dotted line 30 of the drawing is designed and intended for tuning the antenna for the reception of various wave lengths. It is to be understood, of course, that this arrangement of the tuning apparatus is simply illustrative, and is not intended to limit the scope of the invention to the specific form shown.

Having in mind the foregoing description of the parts of the apparatus employed in this circuit and the function of each part, the invention will be clearly understood from the following description of the process of calibration and adjustment.

Let it be understood that for the purpose of testing and calibration at the factory the receiving circuit and the apparatus of the antenna circuit below the point 1 upon the drawing is connected with the aerial X, which may be termed a standard or average aerial. While a wave of definite length as, for example, 360 meters, is being impressed upon the aerial X, the apparatus associated with the antenna circuit will be calibrated for this particular wave length. To do this, the inductance 3 of the auxiliary unit 2 and the condenser 4 thereof would be so set that all subsequent capacity and inductance adjustments necessary for the reception of all the desired wave lengths might be effected by the air condenser 13 and the variable inductance 15; that is to say, at the factory, the auxiliary unit 2 would have its contacts set at some definite position and allowed to remain thus throughout the subsequent calibration process. With the unit 2 set, for example, with the contact 9 and the switch 5 in the position shown, the movable arms 20 and 26 of the variable inductance 15 would then be set upon certain contact points such as 17 and 24 for the 360 meter wave length, and the air condenser 13 would be calibrated for this wave length. This last step consists in rotating the movable plates until sufficient capacity is added to the antenna circuit to produce resonance. Since the dial 12 is rigidly attached to the spindle 11, to which the group of movable plates is also attached, this dial will rotate together with the movable plates and when the antenna circuit becomes resonant for the particular frequency the point upon the dial opposite the index marker (whose position is chosen arbitrarily) is marked with the numeral indicating the wave length corresponding to said frequency. In like manner, the condenser 13 and the inductance 15 may be calibrated for the reception of a different wave length as, for example, 400 meters. Thus, certain contact points of the variable inductance 15 are chosen for 400 meter reception and the movable arms 20 and 26 are set upon the said contacts, and the variable condenser 13 is then adjusted in order to produce the resonance of the antenna circuit for this wave length. When the condition of resonance is attained, the position of the dial 12 with respect to the index marker is noted by putting upon the dial the wave length for which the antenna circuit is then resonant. It should be clearly understood that during this factory test and calibration, the constants of the aerial X and those of the unit 2, when once set, remain fixed throughout the entire subsequent process so that the calibration of the variable condenser 13 and the variable inductance 15 is relative to the fixed constants of the aerial X and the unit 2. The numerical markings upon the condenser 13, for example, simply mean that when the dial is in such position that a certain marked point is opposite the index marker, the total capacity of the antenna circuit is such as to produce resonance of the circuit at the frequency corresponding to the wave length indicated, assuming, of course, that there is the requisite amount of inductance in the antenna circuit; and, similarly, the numerical markings upon the variable inductance 15 indicates that when the movable arms 20 and 26 of the switches are, upon certain contacts, as for example, 17 and 24, the amount of inductance in the antenna circuit will be correct to produce resonance for a particular wave length, as for example, 360 meters. It will be seen, therefore, that the wave lengths indicated by the markings upon the condenser 13 and the inductance 15 are correct only for an aerial having the constants of X and for an auxiliary unit having the constants represented by the setting of the unit 2.

Let us assume that the purchaser or user of this receiving set has an aerial, indicated $X_1$, whose constants with respect to X are represented by the relative sizes of $X_1$ and X. If such user connects conductor 29 of his receiving set with the point 1' of the antenna $X_1$ and attempts to receive, for example, 360 meter signals by setting the switch arms of the inductance 15 upon the properly designated contact points and, the dial of the air condenser 13 so that the point marked 360 will be opposite the index marker, he will undoubtedly find that such setting will not produce resonance of his antenna circuit for such wave length. My invention consists in the provision of a method and means for effecting the adjustment of the previously calibrated air condenser and variable inductance in order that they can be used with an aerial having different constants from the standard or average aerial with which the said apparatus was calibrated. Assuming that a source of definite frequency is available as, for example, a wavemeter capable of emitting a certain wave or a station broadcasting a wave length of 360 meters, the process of adjustment of the calibrated apparatus is as follows: The movable arms 20 and 26 of the switches associated with the variable inductance 15 would be set upon the contact points 17 and 24 and the inductance 3 of the auxiliary unit 2 would be adjusted so as to compensate for the difference between the inductance of the new aerial $X_1$ and the standard aerial X. The proper position of the contact point 9 can be readily ascertained. Since the capacity of the aerial $X_1$ is probably less than that of X, it will be necessary to increase the capacity of the condenser 4 by effectively connecting into the circuit a greater number of the units of the condenser 4 by the operation of the necessary switches, such as 6 or 7 or 8. Let us assume that switch 6 is closed (in addition to 5) and the variable air condenser 13 is operated by bringing the group of movable plates into closer relation with the group of fixed plates. It would probably be found that with the new adjustment of the unit 2 in connection with the new aerial $X_1$, the position of point marked 360 upon the dial 12 for a condition of resonance at 360 meters, is not directly opposite the index marker upon the fixed top of the condenser 13 as shown on the drawing, but will be opposite a point represented by the dotted arrow $a$. If another section of the variable condenser 4 is added to the antenna circuit by the closing, for example, of the switch 7 and the variable condenser 13 is again manipulated to obtain resonance it might be found that the position of the "360" point of the dial for resonance at 360 meters might be opposite a point indicated by the dotted arrow indicated $b$. It will be seen therefore that the index marker, as shown on the drawing, is not in such position relative to the markings upon the dial as to correctly indicate the wave length at which resonance occurs and furthermore that the addition of capacity by closing switch 7 did not improve the adjustment. The switch 7 should accordingly be opened and the index marker should be moved from the position shown in the drawing to the point represented by the dotted arrow $a$, which point indicates the setting of the variable condenser 13 for resonance at 360 meters, using the new aerial $X_1$, and for the new setting of the unit 2. As will be readily understood, the index marker in its new position upon the fixed top of condenser 13 will correctly indicate the condenser setting for the particular wave lengths as shown upon the dial of the variable condenser 13.

It will be readily seen that by the adjustment of the inductance and the capacitance units contained in the auxiliary unit 2, and by the proper positioning of the index marker of the variable condenser, the variable condenser 13 and the variable inductance 15 may thereby be adjusted to correctly indicate resonance of the intenna circuit for the wave lengths indicated by their calibrated markings. So that by using such an adjustment unit as shown upon the drawing and described in the specification and by relocating the index marker upon the face plate of the variable condenser, the calibrated apparatus of the antenna circuit may be adjusted for use with an aerial whose constants are different from those of the aerial with which the said apparatus was calibrated. The relocating of the index marker of the variable condenser 13 is necessary because of the fact that the steps of adjustment of the variable condenser 4 are not sufficiently small, as would be the case if a variable air condenser were used. However, owing to the greater cost of a variable air condenser of a certain size over another type of condenser which is variable by rather large steps, it would undoubtedly be commercially desirable to use a condenser of the latter type in the adjustment unit and to shift the index marker of the variable air condenser whenever it is necessary to adjust it for an aerial having different constants from those with which it was calibrated.

Many variations in the form in which this invention is embodied may be made without departing from the scope of the invention. Thus, for example, the inductance 3, which in the drawing is closely associated with the variable capacity 4, may be made a part of the variable inductance 15, by inserting it between the terminal 27 and the conductor leading to the binding post 14, and making the connection between the said conductor and inductance variable in order to increase or diminish the inductance of the antenna circuit. A further variation of the invention might be made by omitting the variable condenser 4 and making the condenser 13 sufficiently large to care for variations of capacities of various aerials with which the receiving set might be used. By using a single air condenser, the only adjustment necessary for a change of aerial would be to shift the index marker. This, however, would require in most instances a relatively large variable air condenser, which would increase the cost of a receiving set and, accordingly, it would be commercially undesirable.

It may furthermore be pointed out that the adjustment unit comprising the inductance 3 and condenser 4 may be connected in the antenna circuit at any point thereof since it is not limited to the position shown in the drawing. Furthermore, it may be noted that any part of the tuning apparatus of the antenna circuit may be equipped with a vernier adjustment, left uncalibrated, by means of which absolutely exact adjustment of the calibrated apparatus might be secured. Such a vernier would also take care of the adjustment of the apparatus for any slight variation in a wave length from the sending stations.

While this invention has been disclosed as embodied in a particular form and arrangement of parts it is to be understood that it is not so limited but is capable of embodiment in other and different forms within the spirit and scope of the appended claim.

What is claimed is:

In a radio receiving system, the combination with a receiving set comprising tuned primary and secondary circuits, each calibrated with respect to an antenna of known characteristics, of an antenna of unknown characteristics, and an auxiliary tuning circuit comprising variable inductance and variable capacity connected between the said antenna of unknown characteristics and the said tuned primary circuit to cause the antenna of unknown characteristics to have the same characteristics as the known antenna, thereby rendering unchanged the calibrations of the tuned circuits of the said receiving set when connected with said antenna of unknown characteristics.

In testimony whereof, I have signed my name to this specification.

LESLIE S. UPHOFF.